United States Patent [19]
Boykin et al.

[11] Patent Number: 5,023,432
[45] Date of Patent: Jun. 11, 1991

[54] PROGRAMMABLE HOT WATER HEATER CONTROL DEVICE

[76] Inventors: T. Brooks Boykin, 4630 Oakwood Cir., Winston Salem, N.C. 27106; Timothy B. Boykin, 402 Hickory Ridge Dr., Seabrook, Tex. 77586

[21] Appl. No.: 473,418
[22] Filed: Feb. 1, 1990
[51] Int. Cl.$^5$ .............................................. H05B 1/02
[52] U.S. Cl. ................................. 219/497; 219/506; 219/483; 236/21 B; 392/498
[58] Field of Search ............... 219/494, 497, 501, 506, 219/507, 508, 330, 331, 328, 308, 327, 483, 484, 486, 306, 309; 236/21 B

[56] References Cited
U.S. PATENT DOCUMENTS

| | | | |
|---|---|---|---|
| 3,560,712 | 2/1971 | Toohill | 219/497 |
| 4,449,178 | 5/1984 | Blau, Jr. et al. | 219/328 |
| 4,638,147 | 1/1987 | Dytch et al. | 219/328 |
| 4,713,525 | 12/1987 | Eastep | 219/328 |

*Primary Examiner*—M. H. Paschall

[57] ABSTRACT

A hot water heater control device and method for a building such as a home will allow the consumer user maximum savings with a modest investment by allowing the user to program into a control module a particular living cycle and assign a desired temperature to each of a predetermined number of heating start/stop times within the cycle. A means exists for the user to program a desired high, medium, low and off temperature into a control module. Also, any one of several special condition modes may be activated as needed in order to provide maximum flexibility and savings.

17 Claims, 9 Drawing Sheets

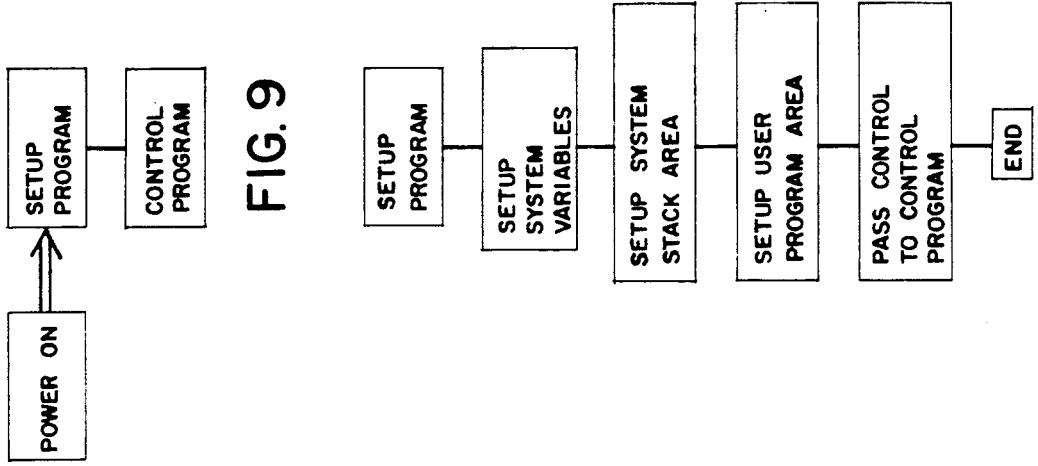
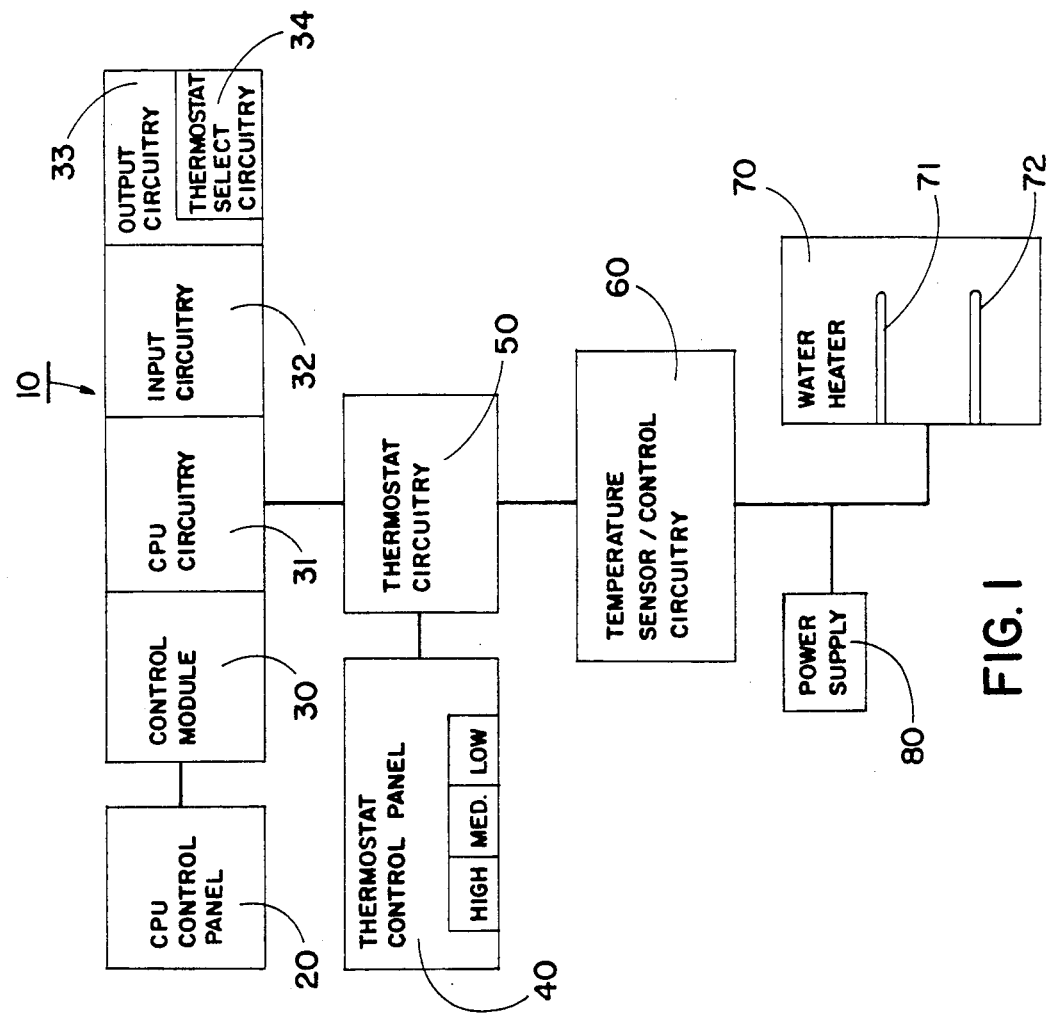

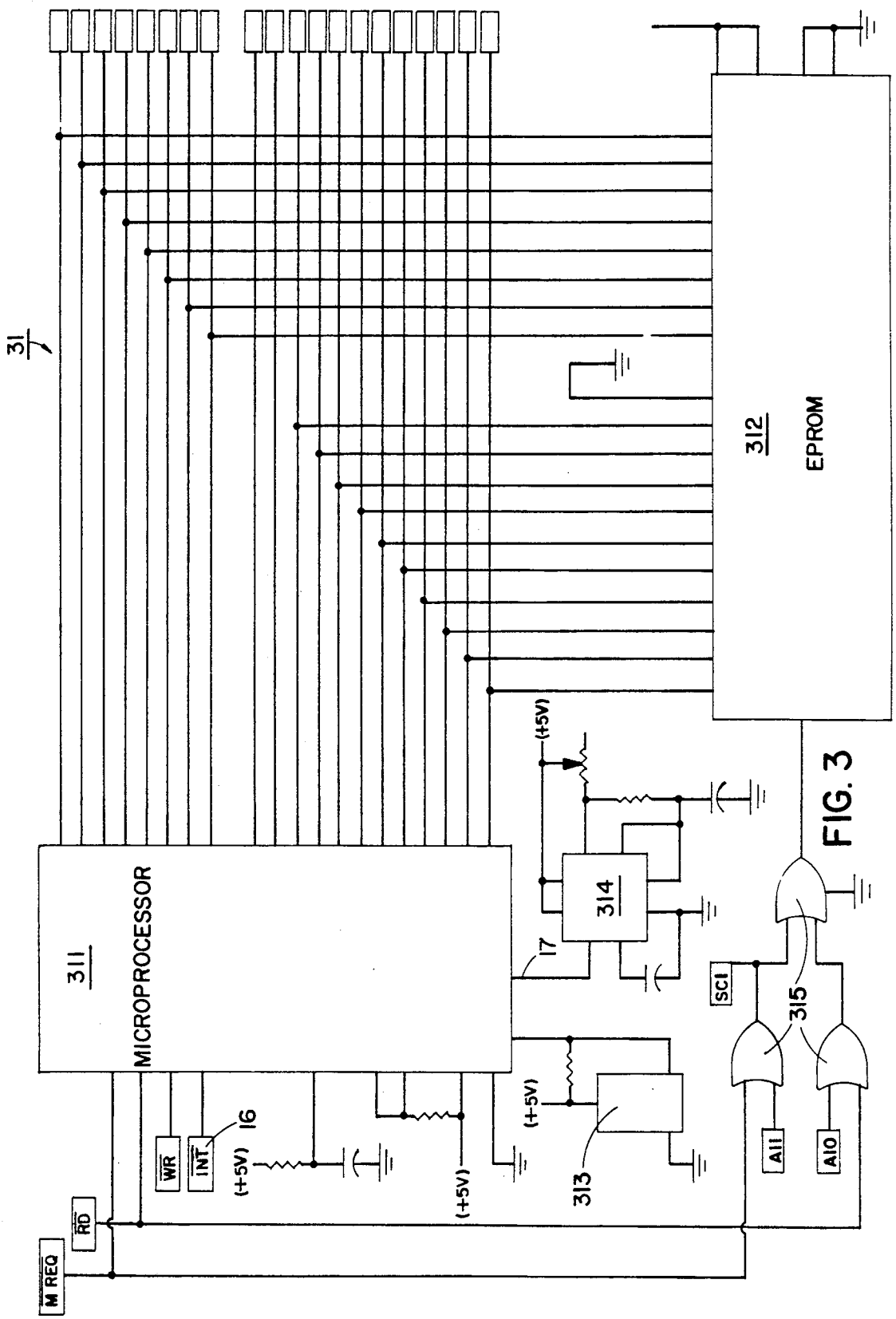

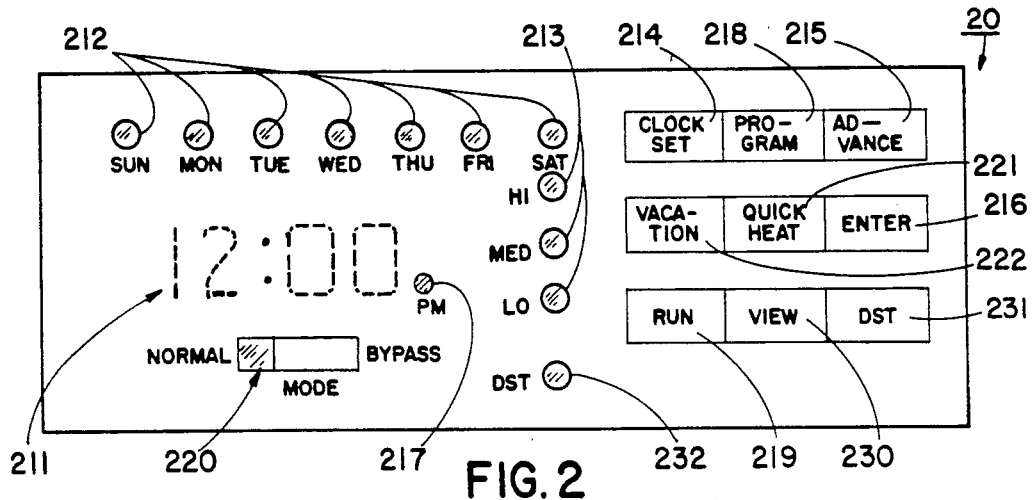
FIG. 2
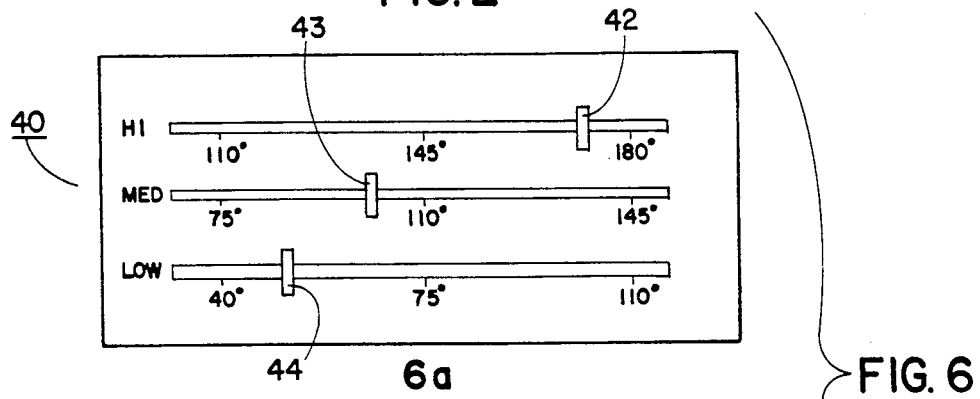
6a
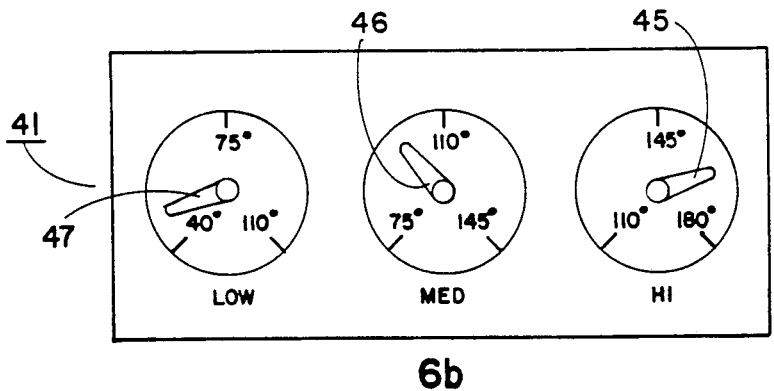
6b
FIG. 6

PROGRAMMABLE HOT WATER HEATER CONTROL DEVICE

BACKGROUND OF THE INVENTION

1. Field of the Invention

The invention herein pertains to a device and method for economically controlling the temperature of heated water in a storage tank to maximize the convenience to the user while minimizing the energy costs.

2. Description of the Prior Art and Objectives of the Invention

There are several different electronic hot water heater control systems today such as Blank U.S. Pat. No. 4,508,261; Boe Pat. No. 4,568,821; Swindle Pat. No. 4,467,178; Jones Pat. No. 4,645,908 and others. However, none of the devices mentioned allow for specific tailoring of hot water heating cycles of particular individuals to the degree or versatility needed.

It is therefore one objective of the present invention to provide a relatively inexpensive controlled, programmable heating device and method which will operate at relatively low cost and will require little modifications to existing hot water heating systems.

It is another objective of the present invention to provide a hot water heater control device and method that is programmable and includes a thermostat panel having three independent adjustable controls for low, medium and high water temperatures.

It is another objective of the present invention to provide a hot water heater control device which includes a control panel having a mode switch, a clock display and temperature indicator lights.

It is yet another objective of the present invention to provide a method for economically providing heated water at various temperatures depending upon the lifestyle of the user whereby a pre-programmed clock is set, start/stop times for heating cycles of particular living cycles are selected, and temperature modes for the heating cycles are chosen whereby water temperature is maintained in the storage tank in accordance with said selections.

It is still another objective of the present invention to provide a hot water temperature control device and method which allows for temporarily overriding the start/stop times and/or temperatures of the heating cycle.

Various other objectives and advantages of the present invention will become apparent to those skilled in the art as a more detailed description is presented below.

SUMMARY OF THE INVENTION

The present invention includes an electronic control module having CPU circuitry, input circuitry and output circuitry. A CPU control panel is joined to the control module for programming the circuitry according to the temperatures desired for various heating cycles. A mode switch is also provided on the CPU control panel and the control module is joined to thermostat circuitry which includes a thermostat control panel having high, medium, and low temperature selections. A temperature sensor/control circuitry is joined to the thermostat circuitry which is also connected to an appropriate power supply.

The operation of the invention provides for an economical heated water supply from a conventional hot water heater tank during extended periods of time with cycles divided into various heating or temperature modes. By setting programmable clock circuitry, and selecting start/stop times for various heating cycles within a living cycle which may be divided into for example, 109 heating cycles, a specific water temperature is selected for each of the heating cycles including "off". At the end of the selected living cycle, which may be one (1) week, the heating cycles or periods with the previously selected temperatures will automatically repeat. The heating cycles with any of the temperatures selected can be overridden temporarily as needed. Also, a "quick heat" mode will automatically select the high thermostat circuitry for a selected period of from one to two hours. A bypass mode will allow for bypass of the pre-programmed selections and will choose the high temperature thermostat circuitry to control the tank temperature. A vacation mode will allow one temperature (hence its corresponding thermostat circuitry) to be selected and remain in effect until manually canceled. In the usual operating mode the heating elements within the water heater are activated as needed to maintain the selected temperatures. A blinking LED display will indicate a clock "not-set" (hence control module not programmed) state after power up. In this state (and in case of power interrupt, hence user entered program erasure for units without battery backups) the device will by default select the high thermostat circuitry to control tank fluid temperature until it is reprogrammed.

BRIEF DESCRIPTION OF THE DRAWINGS

FIG. 1 demonstrates in schematic block fashion the water heater storage tank control device of the present invention;

FIG. 2 illustrates the CPU control panel;

FIG. 3 details part of the CPU circuitry of the control module;

FIG. 6 shows two (2) embodiments of the thermostat control panel;

FIG. 9 demonstrates a schematic of the overall software operation;

FIG. 10 illustrates in block form the setup software program function;

DESCRIPTION OF THE PREFERRED EMBODIMENT

Figure 4:
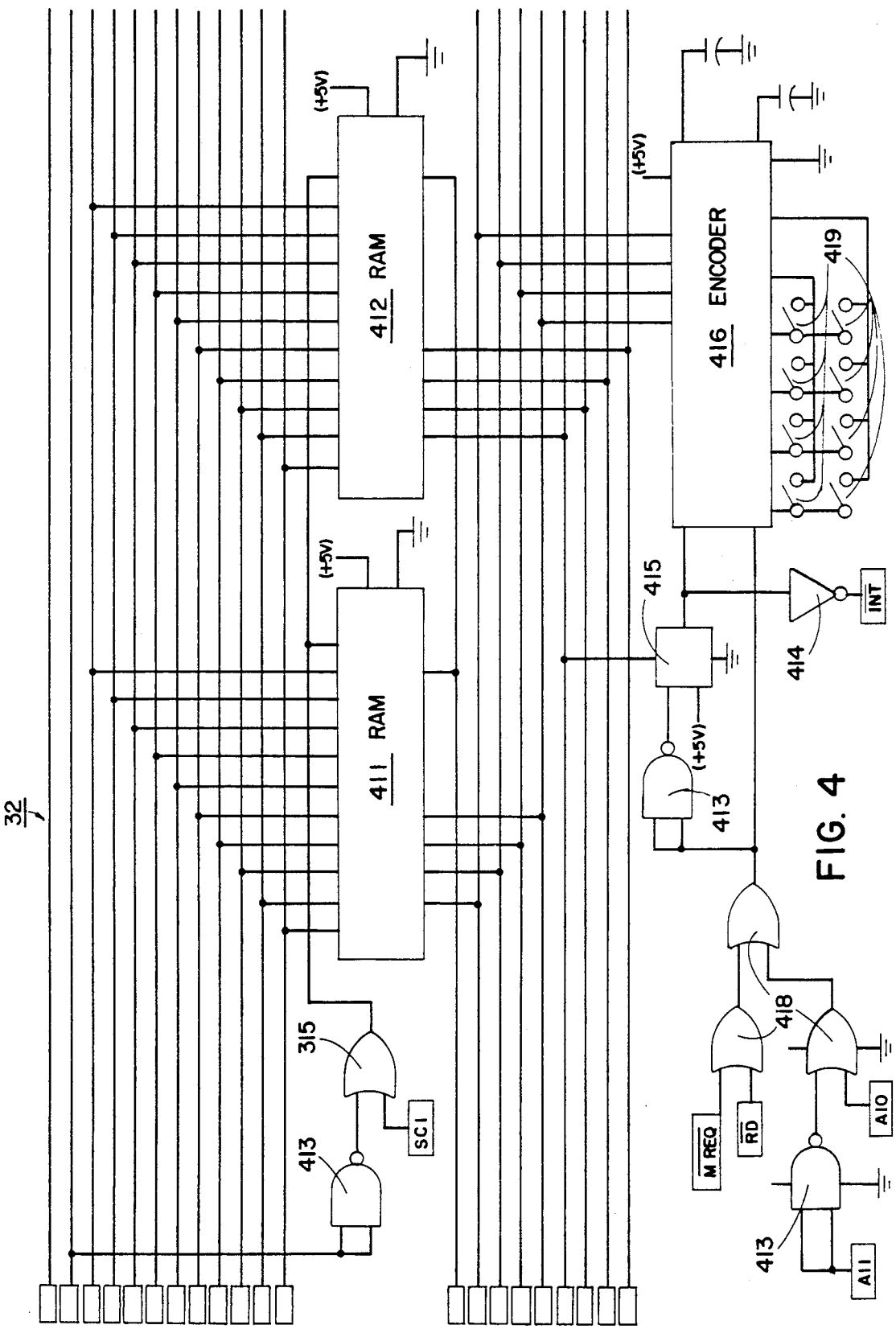
FIG. 4 illustrates the remainder of the CPU circuitry as seen in FIG. 3 and input circuitry of the control module.

The preferred form of the apparatus of the invention is seen in FIGS. 1-8 with the preferred form of the thermostat control panel shown at FIG. 6A. The thermostat control panel of FIG. 6A will allow for the setting of three different temperatures which can be incorporated into specific instructions to control the water storage tank heater elements. The user can make selections as to the proper low, medium and high temperature settings based on knowledge of water volume requirements and frequency of use for specific periods during a living cycle which may be for example, a one week time period having 109 heating cycles therein. The preferred form of the invention includes a control module which is joined to a CPU control panel for programming the device. The control module includes CPU circuitry, input circuitry, and output circuitry having thermostat select circuitry. Also joined to the control module is thermostat circuitry and a thermostat control panel. The temperature sensor/control circuitry is connected to the thermostat circuitry and the temperature sensor/control circuitry in turn is joined to a hot water storage tank such as an electric resistance water storage tank having a pair of heating elements therein. A 220 V AC power supply is joined to the hot water heater and also to the temperature sensor/control circuitry.

DETAILED DESCRIPTION OF THE DRAWINGS AND OPERATION OF THE INVENTION

For a more detailed description of the invention and its method of operation to provide maximum financial savings and desired water heating requirements without affecting the lifestyle of the user, turning now to the drawings, FIG. 6A shows a multi-slide setting thermostat control panel 40 which includes slidable dial handle 42 for controlling the high temperature mode, dial handle 43 for controlling the medium temperature mode and dial handle 44 for controlling the low temperature mode. In the alternate embodiment of the multi-dial setting thermostat control panel 41 as shown in FIG. 6B, rotatable dial handle 45 controls the high temperature mode, handle 46 the medium temperature mode and dial handle 47 the low temperature mode. The low temperature mode may be selected for periods of low water use or nonuse during times when the outdoor temperatures are consistently low such as during winter. A medium temperature mode can be selected for periods of moderate water use or for such activities as bathing or washing clothes. The selection of the high temperature mode is chosen for those periods of the day when the use warrants such, as for example during a morning rush when several people are bathing or for times during extensive dish or laundry washings. A range of temperatures can be selected for each of the modes as seen in FIG. 6A, as the high mode can be as low as 110° F. and can approach 180° F. For three different modes an infinite variety of temperatures can be selected and can be changed simply by manually moving dials 42, 43 and 44 as needed, independent of the programmed control module 30.

Only one temperature sensor point in water heater 70 as shown in FIG. 1 is required which may correspond to the location of the upper heating element 71 in a conventional electric water heater.

The thermostats in a conventional (existing) electric resistive water heater may be bypassed by a relatively simple wiring adjustment technique which may also include setting the existing thermostats on such heaters to their maximum value.

The above technique would be similar and less complex on a gas heater since they typically only have one temperature sensing point.

The function of this (electronic) control module 30 is defined and determined primarily in terms of the customized preprogrammed software resident in the 2716 EPROM IC (312, NEC Electronics, Inc., 401 Ellis Street, Mountain View, Calif. 94043, others). It is the integration of the resident software of the control module 30 and this particular combination and configuration of hardware components that give this control module 30 its uniqueness. The major software programs and their particular control functions are shown in FIGS. 9 through 13.

Part of the CPU circuitry 31 is shown in FIG. 3. Integrated circuit (IC) 311 is a Z80 8-bit microprocessor available from Zilog, Inc., 210 Hacienda Avenue, Campbell, Calif. 95008. (Any of the versions of the Z80 (Z80, Z80-A or Z80-B) may be used.) IC 312 is a 2716 UV-erasable programmable read only memory (EPROM) available from NEC Electronics, Inc. and other manufacturers. This IC 312 stores the custom software a part of which is the clock program, part of which allows the user to input and store a user program (living cycle) and allows user to select one of the special function modes (quick heat, vacation), and another part being the major control program which executes the user entered program.

Device 313 is a 1 MHz oscillator manufactured by SaRonix, Inc., 2479 E. Bayshore Road, Palo Alto, Calif. 94303. The 1 K Ohm resistor between its output and the +5 volts is only necessary if the TTL output version of the oscillator is employed. This oscillator 313 provides the signal necessary for the IC's 311 and 334 to operate.

IC 314 is a 555 or 7555 timer/oscillator available from Intel Corporation, 3065 Bowers Avenue, Santa Clara, Calif. 95051. It is connected in the oscillator configuration. Its output goes to the non-maskable interrupt (17, NMI) input of the IC 311. IC 314 generates the signal which causes the clock program (FIG. 12) to execute at a set frequency. Since this signal is connected to the non-maskable interrupt (17, NMI) of the IC 311, the clock program (FIG. 12) always executes even when a regular interrupt (eg., user input) is being serviced in order to keep the time variables of the control module 30 correct. As currently implemented, IC 314 operates at a frequency of 1 Hz, hence the smallest increment of time discernable by the control module 30 is one second. Thus, the customized clock program (FIG. 12) executes once each second updating the various system time variables as needed (currently seconds, units and tens minutes, units and tens hours, hours-nondisplay, AM/PM, and day). Oscillator configurations other than the 555/7555 type and/or the 1-second frequency may be employed but the clock program (FIG. 12) must be modified to match the frequency of said configuration. For the current application, the interrupt of 1-second was appropriate. INT and NMI as used herein electronically to represent an active low signal.

Independent gates 315 comprise a quadruple two-input "OR" gate IC, such as a 74C32 or 74HC32 (National Semiconductor, 2900 Semiconductor Dr., Santa Clara, Calif. 95051). The three gates 315 shown in FIG. 3 decode signals from IC 311 so it may read IC 312.

The remainder of the CPU circuitry 31 is shown in FIG. 4. Two (2) static random access memory (RAM) ICs (411, 412) are arranged to give 1 K (1024) addresses of 8-bit wide data (versions available from Intel, National Semiconductor, NEC, TI and others). RAM ICs 411, 412 store the clock and system variables, provide the stack needed by the IC 311, and store the user programs. The remaining "OR" gate (315) and one-fourth of a 74C01 or 74HC01 quadruple two-input "NAND" gate IC 413 (National Semiconductor) decode Z80

(311) signals so that data may be stored in or retrieved from the RAM (411, 412).

Input circuitry 32 is shown in FIG. 4, also. The most important part of the input circuitry 32 is the 74C922 hexadecimal keyboard encoder 416, (National Semiconductor). The user presses a key on the CPU control panel 20, composed of switches or keys (419) and the 74C922 (416) produces the four-bit binary equivalent. The 74C922 (416) notifies the Z80 (311) that input has occurred on the regular (maskable) interrupt line (16, INT). Inverter (414), one of six on a 4049 hex inverting buffer IC (National Semiconductor), is necessary because the 74C922 (416) generates an active-high signal when a key is pressed, while the Z80 (311) expects an active-low interrupt signal. "OR" gates (418), part of another 74C32/74HC32, and "NAND" gates (413) decode Z80 (311) signals so that the data corresponding to the key pessed may be read. Device 415, one-fourth of a 4066 quadruple analog switch (National Semiconductor), makes an additional 74C922 (416) signal (which is high as long as a key is being pressed) available to the Z80 (311) when it reads the other data from the 74C922 (416) (important for the "advance" function).

Figure 5:
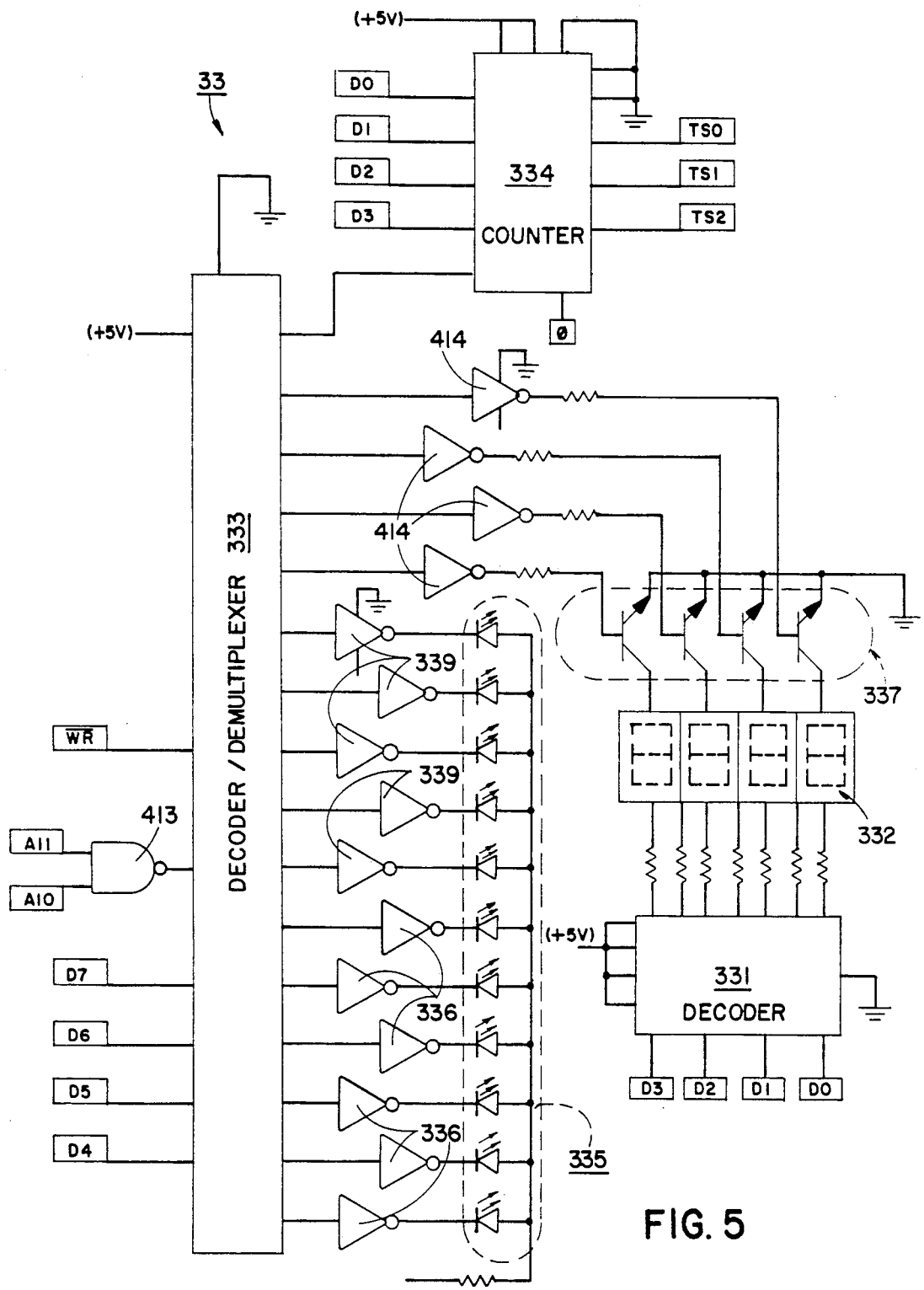
FIG. 5 depicts the output circuitry of the control module.

The control module output circuitry 33 is shown in FIG. 5. The major elements of the output circuitry 33 are a 74C154/74HC154 four-line to sixteen-line decoder/demultiplexer (333), a 74C48 four-bit to seven-segment display decoder (331), and any synchronously-loadable register, such as the 74C161/74HC161 four-bit synchronous binary counter (334). (All three ICs available from National Semiconductor.) "NAND" gate (413) decodes Z80 (311) control signals so that the Z80 (311) may write data to the 74C154/74HC154 (333). The 7417 TTL buffers 336, 339, (Texas Instruments, Dallas, Tex. 75265) boost the 74C154/74HC154 (333) output signals so that the 74C154/74HC154 (333) can control the individual LEDs 335 (many sources). Each of the 2N2222 silicon transistors 337 (Motorola Corporation, 5005 East McDowell Road, Phoenix, Ariz. 85008) controls one digit of the four-digit, seven-segment, common-cathode multiplexed LED display 332 (National Semiconductor, others). The 4049 inverters 414 (National Semiconductor) allow the 74C154/74HC154 (333) to switch transistors 337 on and off (to control the numeric LED display digits 332). Thermostat select circuitry 34 is a critical component of the output circuitry 33 (FIG. 5). The major element of the thermostat select circuitry 34 is register 334. This register is loaded by IC 311 with data as to which temperature (hence, which thermostat circuitry 61, 62, 63) has been selected for the current time period. Part of the output of register 334 are the signals (TSO, TS1, TS2) which determine which thermostat circuitry (61, 62, 63) currently has control of the water heater or tank 70. These output signals (TS0, TS1, TS2) are connected to the temperature sensor/control circuitry 60 (FIGS. 7 and 8) which in general will be different for different types and makes of water heaters. The control module 30 will therefore be independent of the specific heater to which it is attached. All of the heater dependence will be contained in the thermostat circuitry 50 and/or temperature sensor/control circuitry 60.

Figure 13:
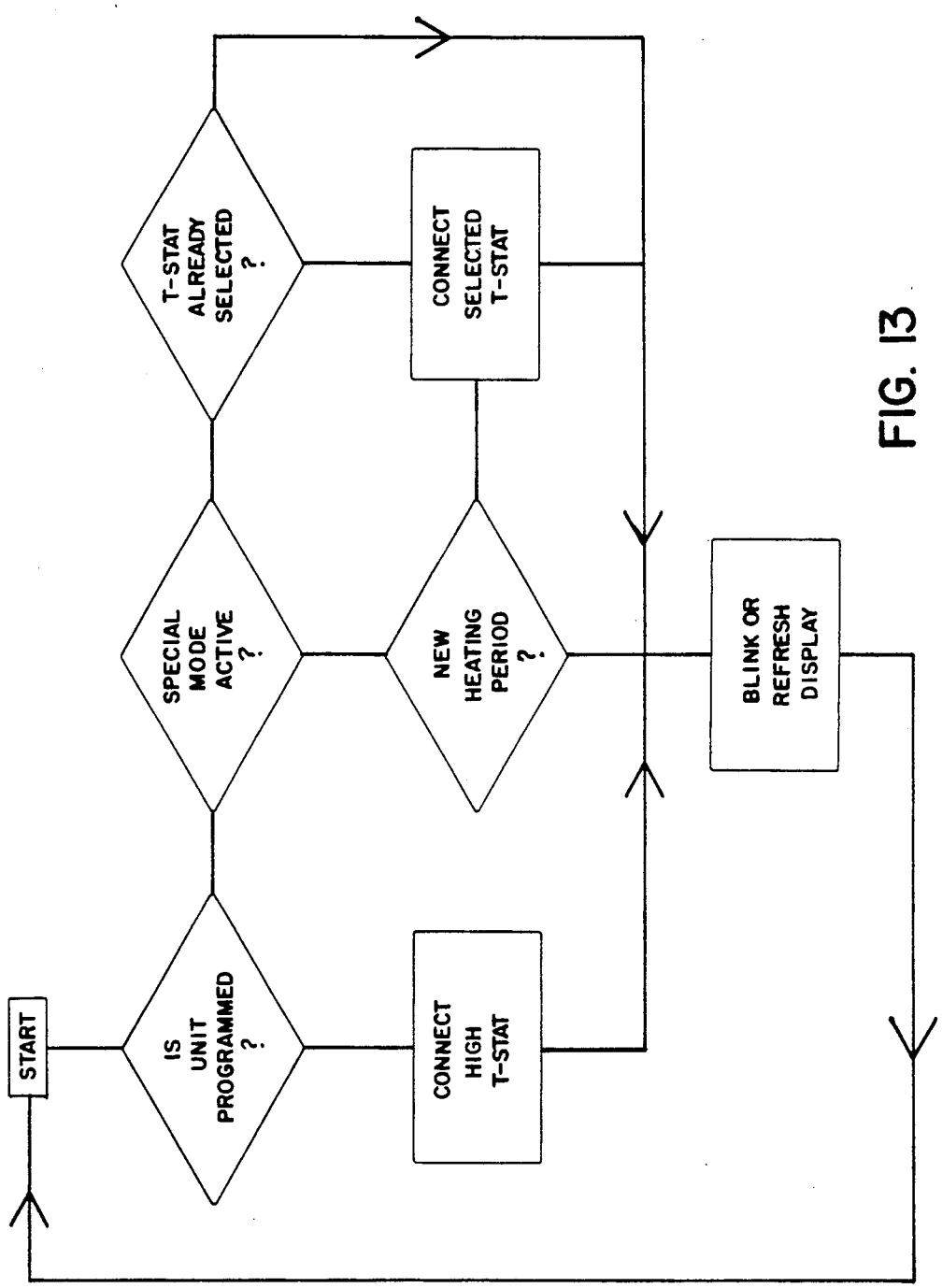
FIG. 13 features a flow diagram of the control program function.

Proper display software is essential for the operation of LEDs 332, 335 of the output circuitry 33. Neither the 74C48 display decoder 331 nor the 74C154/74HC154 decoder/demultiplexer 333 has a register in it, thus LEDs 332, 335 stay lit only as long as the Z80 (311) is writing to the output circuitry 33 (only a few microseconds each time through the program loop—the actual interval will vary with the sub-routine). The display portion of the output circuitry 33 is designed such that only one digit of numeric display 332 or only one of the individual LEDs of the day and temperature display 335 can be active or lit at any given instant. It is therefore essential that the software resident in EPROM IC 312 refresh the display often enough such that the human eye will not detect blinking and that the proper combination of LEDs appear to be "continuously" lit for the given conditions. Likewise, control module 30 software causes time display (211, 212, 213) to "blink" when the control module 30 is in a clock "not-set" state (hence, unprogrammed) (FIG. 13).

Figure 11:
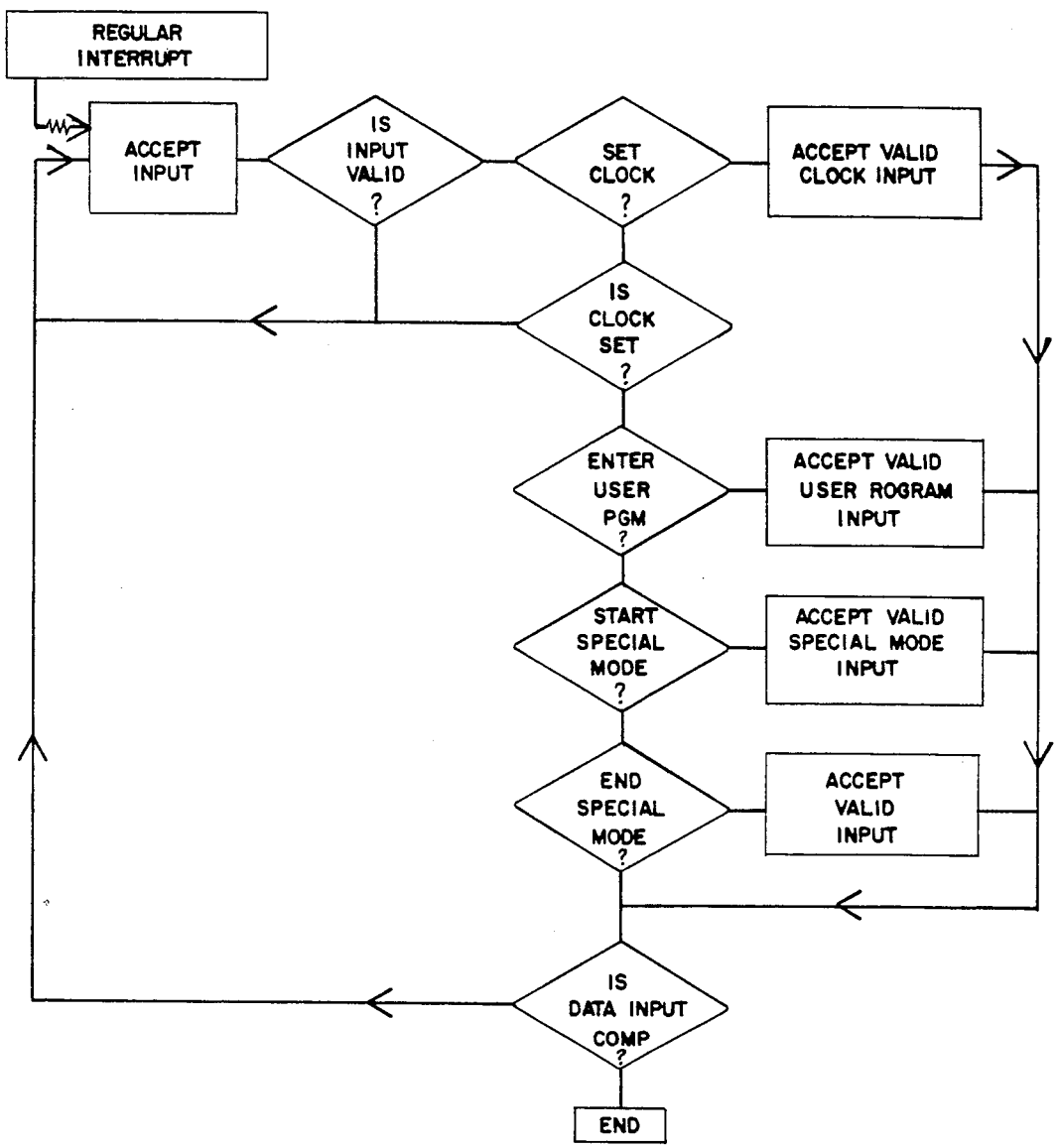
FIG. 11 depicts a flow diagram of the user input program function.

The regular interrupt service routine or user input program (FIG. 11) is the program which allows the user to set the clock, enter programs, and select special modes. This routine is invoked each time a signal is sent to the Z80 (311) via its regular (maskable) interrupt line 16, (INT). Each time a key on the CPU control panel 20 (FIG. 2) is pressed, a signal is generated by the 74C922 (416) which goes to the regular interrupt line 16 (INT) of the Z80 (311). When the user input program (FIG. 11) is expecting input data, Z80 (311) continuously reads the output of the 74C922 (416) until the proper input is received. Holding down the "advance" key 215 simply causes this program to increment the appropriate variable (seconds, temperature, etc.). The user input program (FIG. 11) simply ignores invalid input (for example, trying to do any program entry before setting the clock). Since the clock program (FIG. 12) is triggered by set frequency non-maskable interrupt signals, it will periodically cause non-noticable (millisecond) pauses in the regular interrupt service routine (FIG. 11).

Figure 12:
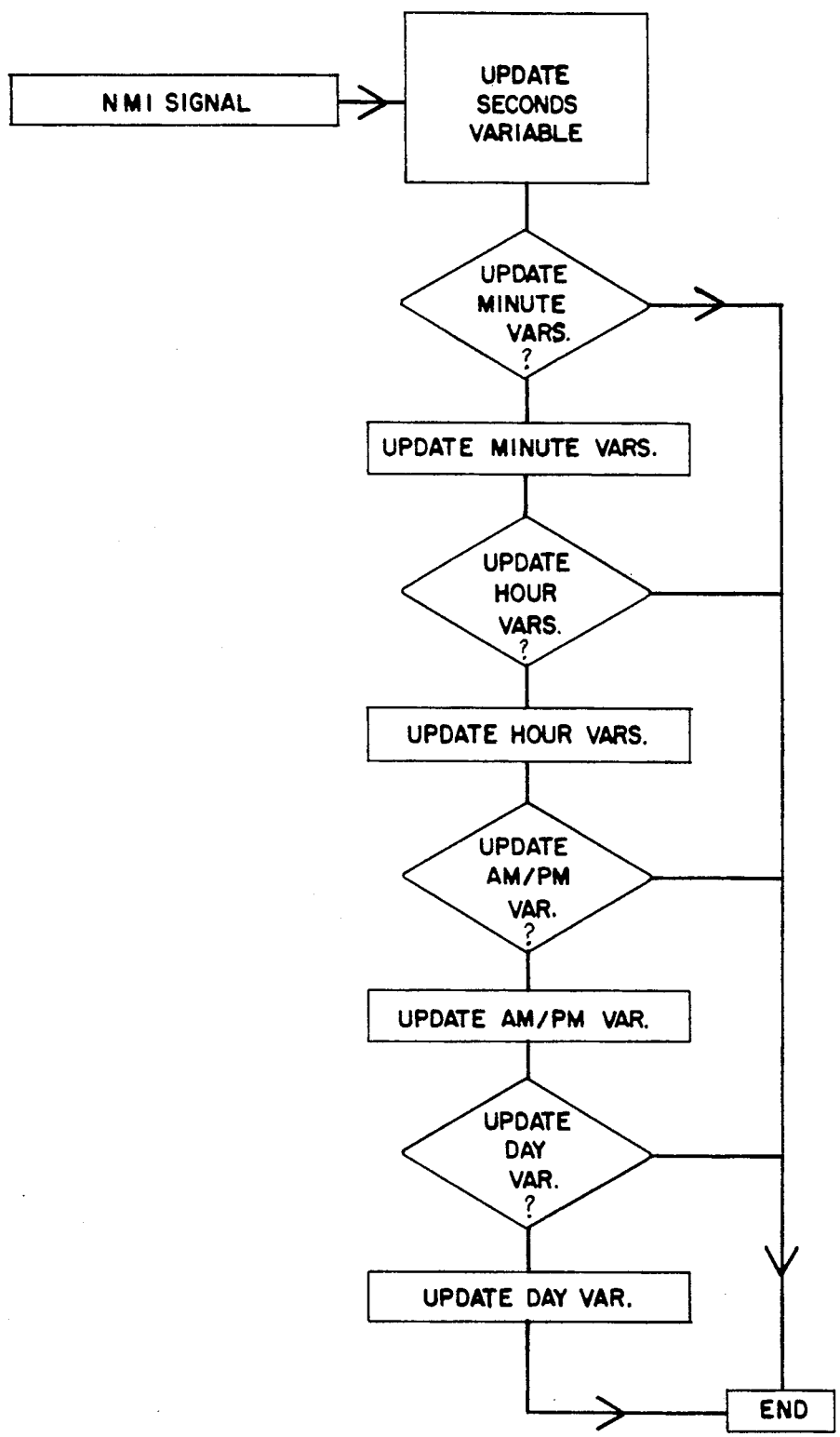
FIG. 12 shows a schematic of the clock program function.

The customized software of control module 30 operates by establishing and continually updating and reading certain system "variables". Those variables are: seconds, units minutes, tens minutes, units hours, tens hours, AM/PM, day, current temperature, hours nondisplay, status, and program temperature. The first seven of these variables and hours-nondisplay are updated by the non-maskable interrupt service routine (FIG. 12). Of these, all but seconds and hours-nondisplay are of display format meaning that they may be written directly to the output circuitry 33 (FIG. 5) and will result in the appropriate LEDs (332, 335) being lit. The "seconds" variable is used by the clock program (non-maskable interrupt service routine, FIG. 12) as the basic unit by which time is kept. Hours-nondisplay is merely a convenient way for the various programs to interrogate the time. "Current temperature" is also of display format. In addition, a simple transformation on the upper four bits of the "current temperature" variable allows that data to be used in deciding which thermostat circuitry (61, 62, 63) is to be selected for the current time period.

The "status" variable is used to maintain other information necessary for the various control module 30 programs to function properly. Some of the information stored in this variable includes the clock's status (set or not), if the control module 30 has been programmed, if a special mode has been selected, and if a program has been temporarily over-ridden by a special mode. Finally, because a user program keeps executing during a temporary over-ride by a special mode (although its output is ignored by the control program FIG. 13), the variable "program temperature" keeps track of the user program's current thermostat circuitry (61, 62, 63) selection so that upon special mode termination the previously chosen temperature control can be restored.

Figures 7, 8:
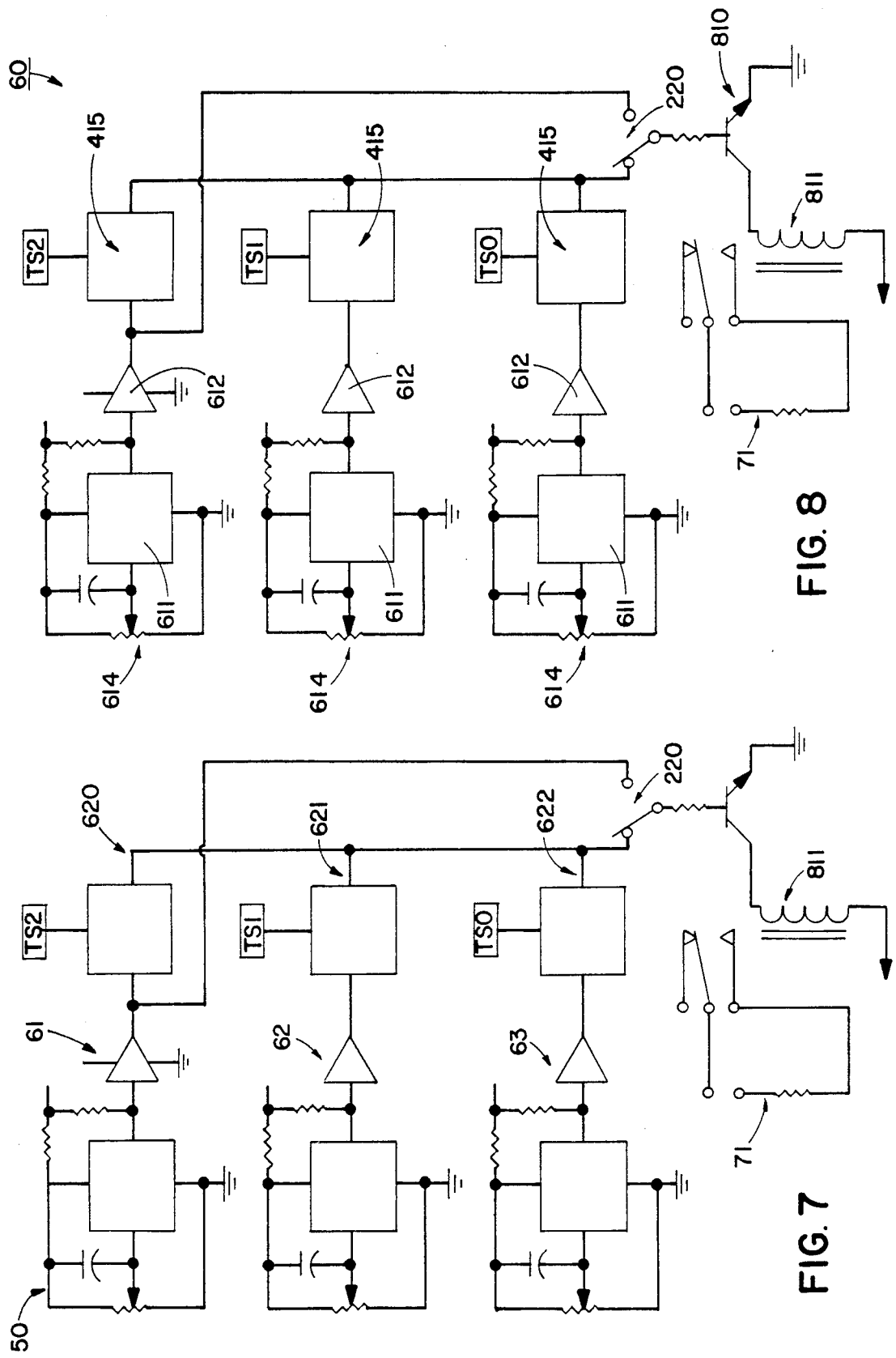
FIG. 7 illustrates details of the thermostat circuitry.
FIG. 8 shows the temperature sensor/control circuitry.

FIG. 7 (left-hand most part only) represents the thermostat circuitry 50 which control module 30 uses to maintain the temperature of the fluid in the tank 70. At the beginning of each temperature cycle control module 30 selects a thermostat circuitry (61, 62 and 63) based on the particular temperature mode setting (low, medium, high, off) picked for that time period and "connects" the output line (620, 621 and 622) of that thermostat circuitry (61, 62, 63) to relay 811 (via transistor 810) allowing heating elements 71 and 72 to activate or to open gas solenoid (for gas heater) to heat the fluid contained in the tank 70 if the temperature is below that as specified on the selected thermostat 614. If a temperature setting of "off" is selected for a particular time period control module 30 selects no thermostat circuitry (61, 62, 63) and the heater controls as shown in FIG. 8 are not energized.

One possible realization of temperature sensor/control circuitry 60 is shown in FIG. 8. There are three LM3911 temperature sensor/controller ICs 611 (National Semiconductor) configured as controllers. The user sets the desired temperature for the high, medium, and low thermostats (represented by the 50k-ohm potentiometers, 614). Whenever the temperature of the LM3911's case 611 goes above the set temperature, its output goes negative. Each of the three buffers 612 is one sixth of a 4050 hex non-inverting buffer (National Semiconductor, others). Buffers 612 convert the higher voltage (usually 9 v-15 v) signal of the LM3911's (611) to 5 v. Their outputs go to the three remaining 4066 switches 415 (National Semiconductor). Each 4066 (415) in FIG. 8 is controlled by register 334 of the output circuitry 33 (FIG. 5). The control module's 30 customized software loads register 334 so that it will select no more than one 4066 (415) at any given time. The selected switch 4066 (415) is thus connected to the NPN silicon transistor 810. (The specific transistor used will depend on relay 811 or other actuator used but may be a type such as the TIP31, NPN power transistor, 40 W power dissipation; or a type such as the TIP3055, NPN power transistor, 90 W power dissipation (Texas Instruments or Motorola)). When transistor 810 input becomes negative (hence, the tank fluid has reached the temperature as specified on the selected thermostat 614 causing the LM3911's (611) output to go negative) it turns off, thus turning off relay 811 which in turn shuts off the heater's power source (or gas flow).

As mentioned above, the software decides which thermostat circuitry 61, 62, 63 is to control the tank fluid temperature by turning on the appropriate switch 415 based on the user program running, the time and whether a special mode and temperature has been selected. If the user has selected the "off" temperature for the current time slot, then neither thermostat circuitry 61, 62, 63 is connected to transistor 810 and heater controls 811 are not activated regardless of the outputs of any of the LM3911's (611). (All of the switches 415 will be "off"). As can also be seen from FIG. 8, when the bypass mode (FIG. 2, 220) is activated, the heater relay 811 (or solenoid) is connected directly to the "high" thermostat circuitry 61, bypassing each of the 4066 (415) switches hence bypassing any signals (TS0, TS1, TS2) from the control module 30 as to which thermostat circuitry 61, 62, 63 to connect to the heater relay 811. When the control module 30 is first powered up, and/or in an unprogrammed state, by program default it automatically selects the "high" thermostat circuitry 61 (FIG. 13).

As can be seen from the above discussion, control module 30 does not compare or control temperatures. By the instructions which have been (control program FIG. 13) or which can be (user entered program FIG. 11) entered into it, it merely decides which thermostat circuitry (61, 62, 63, or none) to connect to the heater relay 811 (or solenoid). Therefore temperature control is maintained by the selected thermostat circuitry (61, 62, 63) which is completely independent of the control module 30 itself thus rendering the control module 30 completely independent of any particular heater type. Whether in an unprogrammed state (as at power up), in normal program mode, or one of the special modes the control module 30 simply selects a thermostat circuitry (61, 62, 63) to maintain control of the fluid temperature in the heater or tank 70 based on the particular set of instructions in control for that period of time. In an unprogrammed state, for the duration of the "quick heat" special mode, or when bypass mode is selected, the high thermostat circuitry 61 is selected to control the fluid temperature in tank 70.

To operate, the user first manually selects temperature settings for the three modes as shown in FIG. 6A (high, medium and low). When device 10 is connected to power supply 80, time display 211 as seen in FIG. 2 will blink "12:00" and the day of week display 212 will indicate "SUN" and the temperature display 213 will indicate "high". If unprogrammed, in this state, device 10 will stay in this "high" mode and the water heater 70 will constantly maintain the temperature as set by the "high" mode thermostat setting as seen in FIG. 6. To program control module 30 as shown in FIG. 1, the clock variables (FIG. 12) must be programmed or set to the current time before any programming can occur or before any of the special functions other than "bypass" can be activated. Setting the clock variables will override or erase any existing program, quick heat, or vacation mode selection as shown in FIG. 2. The functions of quick heat and vacation will cancel each other out if one is selected while the other is currently active.

Setting the clock variables allows the owner to program discrete heating start/stop times into control module 30. To set clock, first press the clock set key 214. This will cause the display (211, 212, 213) to go blank momentarily. The following sequence of events is predetermined for the convenience of the user. Once the clock set key 214 has been pressed, user input program (FIG. 11) will allow one to set the correct day. This is accomplished by pressing and holding the advance key 215 until the proper day indicator 212 LED (Sun—Sat) is lighted. Pressing the enter key 216 will store the current day and again display 211 will go blank momentarily. At this point, pressing the advance key 215 again will automatically advance the hour digits of the clock display 211. The PM LED 217 will light for the P.M. hours. Pressing enter key 216 will store the current hour and again display 211 will go blank temporarily. After this pressing advance key 215 will allow for the clock minutes to be set. Pressing enter key 216 now will automatically terminate the clock set function. Again display 211 will go blank momentarily. At this point, clock set key 214 will have to be pressed again to change or reset the clock. Setting the clock stores the appropriate values for minutes, hours, hours non-display, A.M., P.M., and day. The clock is a customized software program stored in EPROM integrated circuit 312 of control module 30.

To obtain maximum benefit from device 10, the appropriate living cycle of heating start/stop times and a selected temperature for each should be programmed. This is the major control function of device 10. Pressing program key 218 and then enter key 216 starts this function. Control module 30 will then allow the user to set these start/stop times and their associated temperatures in the following manner. By pressing the advance key 215 next (if time unit needs advancing) in the same manner as previously mentioned for setting clock, control module 30 will now allow one to set or accept the day, hour and minutes for the start of the first heating period. Pressing the enter key 216 between the advancing of each of the time units (day, hour, minute) stores that value and automatically advances one to the next function, the same way as mentioned above.

Performing the above selections sets the start time for the first heating period. Pressing the advance key 215 at this point will allow one to select the appropriate temperature. This will cause the temperature indicator LEDs 213 to be lighted in sequence. There are four temperature settings. When no temperature LED 213 is lighted, a temperature of "off" is in effect. This feature will allow the user to specify periods of time during which the heater 70 will not normally be energized. Pressing the enter key 216 while in the select temperature mode will accept and store the indicated temperature (high, medium, low or off) for this first heating period. The temperature selected corresponds to the appropriate setting as indicated on thermostat control panel 40 as pictured in FIG. 6A (or FIG. 6B). After enter key 216 is pressed to select a temperature, the LED display 213 will remain blank. Pressing enter key 216 again will allow one to select the start day and time for the next heating period and the appropriate temperature for that heating period. The start of a subsequent heating period automatically marks the end of the most previous heating period. The programming (and the storing of the associated and entered data) of these heating start/stop times and their selected temperatures is made possible by the user input program (FIG. 11) in the same manner as the entering and storing of data for setting the clock (parts of the "regular interrupt service routine").

Repeating the above procedure will allow the owner to set up to 109 (as per current embodiment) heating start/stop periods in a given, living cycle. A living cycle is that period of time defined by the programmer or owner of the device 10 as that period of time over which the programmed instructions repeat, for example, for most users that period of time is generally a one week period. The present model of the current invention will accommodate a living cycle specified in terms of multiples of a week. This means that a one, two (or more) week cycle could be programmed and the program would repeat automatically at the end of that time period. (In an alternate embodiment of the current device, a living cycle of other than seven days could be programmed into the unit if that were desired).

When programming is finished for the living cycle, pressing run key 219 will terminate program instruction entry. The user program begins executing control over thermostat circuitry selection as soon as it encounters the first (or next) heating start time instruction and the CPU control panel 20 would reflect the current operating conditions of the device 10 (as long as the mode switch 220 is in the normal position) by lighting the appropriate LEDs 212 for day, time 211 and temperature 213.

The current count of 109 heating start/stop periods in a given living cycle merely represents the value for that parameter which could be accommodated by the current hardware of the present configuration. This value could be increased or decreased depending on the needs for a given application. The present value would allow the typical user to divide each day (in a one week cycle) into 15 heating start/stop periods. If a user wanted to program a two week living cycle, then the present embodiment of the invention would allow for up to seven heating start/stop times for a given day.

For the typical family or living unit, hot water requirements follow a predictable pattern of differing needs. An example would be the following: the morning rush from around 5:30 A.M. until around 7:30 A.M. (high usage); 7:30 A.M. until 3:30 P.M. (medium, low or off); 3:30 P.M. until around 5:30 P.M. may represent another unique period of different usage; from 5:30 P.M. until around 11:00 P.M. may represent a period of different usage and from then until 5:30 A.M. would be a period of low or no usage. That would be for a typical workday. Weekends may follow different patterns and the versatility of the present invention will allow for a different set of instructions to take control for weekend periods. Some days may require more heating start/stop times than others and that too can be accommodated. Within a living cycle, several unique patterns can be programmed into the device 10 and they will automatically repeat at the end of the cycle. For the typical living unit, five or six unique heating start/stop times per day would generally be more than sufficient.

Under normal operating conditions unless otherwise specified, the control module 30 will display the current time via the clock display 211, the current day of the week 212, and the active temperature selection for the current active heating period 213 (if mode switch 220 is in the "normal" position).

In an alternate embodiment of the present device, a view key 230 could allow the owner to page or walk through the existing program changing the selected temperature as needed to adjust to changing living or environmental conditions. An example would be changing all low temperature selections to off for the warmer months and vice versa.

Additionally, a daylight savings key (231) and corresponding (232) LED could be added to the CPU control panel 20 to allow for adjustments for switching back and forth between daylight and standard time. This would also involve a slight change to the clock program FIG. 12.

Also, appropriate circuitry and indicator lights may be added to either the CPU control panel 20 or to the temperature sensor/control circuitry 60 to indicate a hardware error condition such as a non-continuous circuit (for electric heaters) or a pilot out condition (gas heater) to prevent activating heater controls.

Special mode operation: (Special function settings)

Provided the user allows a sufficient window around the normal schedule, the versatility of the present invention should adequately cover the needs of the typical living unit with little or no ongoing attention. However, for those unanticipated conditions, control module 30 has three special modes of operation.

For a brief period of unanticipated high usage need, a momentary pressing of the quick heat key 221 will temporarily select the "high" setting thermostat circuitry 61 to control the tank fluid temperature for a period of not less than one and not more than two hours depending on the exact minute within the hour the key is pressed (the length of this function could be changed in an alternate embodiment of the invention without representing a significant functional departure). Pressing quick heat key 221 again after it had been pressed and before this quick heat cycle is over will just reset the quick heat clock the same as if this were the initial activation of that logic. At the end of the quick heat cycle, provided the mode switch 220 is in the normal position, the previously programmed instructions will resume control of thermostat circuitry selection.

Another special mode of operation is the bypass mode which is activated when the mode switch 220 is moved to the bypass position. This mode of operation has the effect of "bypassing" the pre-programmed logic and selects the "high" thermostat circuitry 61 to control the tank fluid temperature and leaves it in that mode until the mode switch 220 is moved back to the normal setting. At that time, any previously running program would automatically resume control of thermostat circuitry selection. In this mode heater control is the same as it is in the unprogrammed state.

The vacation mode key 222 is another special operating mode of the control module 30. The purpose of this key is to allow the user the convenience of maximum savings for any period of nonuse whether it be only minutes or several weeks without having to reprogram the control module 30. When activated, the vacation logic allows one to select (via the advance key 215 as previously discussed) one of the four temperatures (including off). Pressing enter key 216 after having selected the applicable temperature will give control to the vacation logic. The temperature of the fluid in the tank 70 will be maintained continuously by the selected thermostat circuitry (61, 62, 63) until vacation logic is terminated. This function will allow one to leave water heater 70 at the low or off setting for the duration of that period of time.

To end the vacation mode (or quick heat mode before it normally cycles off) the program 218 and run keys 219 must be pressed in that sequence. At that time, control will be returned to the previously programmed instructions provided the mode switch 220 is in the normal setting. The "bypass" and vacation modes of operation must be cancelled manually whereas the "quick heat" mode of operation may be cancelled manually or will automatically cycle off after a predetermined period.

Alternately, additional LEDs may be provided on CPU control panel 20 (FIG. 2) which would light up for the duration of either of the special modes of quick-heat or vacation operation or to blink for the duration of the bypass mode of operation.

In the event of a power loss of significant duration to erase any user entered program (including all related system variables), the control module 30 will by default select the high thermostat circuitry 61 to maintain the temperature of the fluid in water heater 70 as per the setting of the high thermostat as seen in FIGS. 6A or 6B. This will reduce the negative impact of a power interrupt/loss on the owner who can reprogram control module 30 at the next convenience.

In an alternate embodiment of the current device the capacity for the device 10 to maintain its programmed instructions during a short power loss may optionally be provided by a battery backup (not shown).

These special modes of operation are made possible through a combination of both hardware and customized software preprogrammed into the control module 30. For the duration of any special mode, any previously entered user program continues to run, but thermostat circuitry selection is taken over by the special mode function.

In the drawings as seen in FIGS. 9-13, FIG. 9 is a block diagram of the overall operation of the control module 30 software in normal (non-interrupt) situations. When the device 10 is powered on, the setup program FIG. 10 automatically executes. When the setup program FIG. 10 has completed its function, it transfers control to the control program FIG. 13 which executes continuous control over the device 10.

The major functions of the setup program (FIG. 10) are to define and setup the system variables, the system stack area, and the user program area.

FIG. 13 is a diagram of the major function of the control program which executes continuously once it receives control from the setup program FIG. 10. As can be seen from FIG. 13, the control program first checks the system variable "status" to see if the control module 30 has been programmed. If it has, the control program FIG. 13 executes the user program (giving priority to any special mode that has been invoked) selecting the appropriate thermostat circuitry (61, 62, 63) to control the heater 70. If the control module 30 has not been programmed, then it automatically connects the "HIGH" thermostat circuitry 61. The control program FIG. 13 also continuously refreshes the LED displays causing the display to continuously reflect the proper display for the conditions in effect for any given moment.

Clock as used herein is a specialized software program (FIG. 12) whereby its purpose is to keep control module 30 time variables continuously updated.

FIG. 11 is a block diagram of the major functional elements of the user input program the major function of which is to accept, validate, interpret, and act upon user entered data. As can be seen from the diagram, the control module's 30 clock has to be set before any user program instructions can be processed.

The illustrations and examples provided herein are for explanatory purposes and are not intended to limit the scope of the appended claims.

We claim:

1. A device for selectively controlling the temperature of stored water in a tank over extended time periods, said tank having a heating element, a temperature sensing means and a water inlet and outlet, the improvement comprising a programmable control module, said control module comprising:
   (a) CPU circuitry
   (b) input circuitry, and
   (c) output circuitry, said output circuitry comprising thermostat select circuitry, said input circuitry and said output circuitry connected to said CPU circuitry, and said thermostat circuitry connected to said CPU circuitry, said thermostat circuitry comprising a plurality of independent thermostat circuits, temperature sensor/control circuitry, said temperature sensor/control circuitry, said thermostat circuitry connected to said CPU circuitry, a thermostat control panel, said thermostat control panel connected to adjustable temperature controls, said manually adjustable temperature controls positioned on said thermostat control panel, said manually adjustable temperature controls comprising:

(1) a high temperature control,
(2) a medium temperature control, and
(3) a low temperature control, said temperature controls each connected to one of said thermostat circuits whereby said stored water will be heated to the temperature indicated by said manually adjustable control of the selected thermostat circuit as determined by said thermostat select circuitry.

2. A device as claimed in claim 1 and including a CPU control panel, said CPU control panel joined to said CPU circuitry.

3. A device as claimed in claim 1 and including a power supply.

4. A device as claimed in claim 1 wherein said CPU circuitry comprises:
(a) processor circuitry, and
(b) memory circuitry,
said processor circuitry joined to said memory circuitry.

5. A device as claimed in claim 1 wherein said input circuitry comprises encoder circuitry.

6. A device as claimed in claim 1 wherein said output circuitry comprises:
(a) a decoder circuitry,
(b) an electronic display, and
(c) thermostat select circuitry,
said decoder circuitry connected to said electronic display and said thermostat select circuitry connected to said decoder circuitry.

7. A device as claimed in claim 2 wherein said CPU control a mode switch.

8. A device as claimed in claim 2 wherein said CPU control panel includes control keys.

9. A device as claimed in claim 2 wherein said CPU control panel includes a clock display.

10. A device as claimed in claim 2 wherein said CPU control panel includes a day indicator.

11. A device as claimed in claim 2 wherein said CPU control panel includes a temperature indicator.

12. A device as claimed in claim 1 wherein said CPU circuitry includes a first oscillator.

13. A device as claimed in claim 12 wherein said CPU circuitry includes a second oscillator.

14. A device as claimed in claim 1 wherein said input circuitry includes an encoder circuitry.

15. A device as claimed in claim 1 wherein said output circuitry includes a decoder circuitry.

16. A device as claimed in claim 1 wherein said output circuitry includes a register, said thermostat select circuitry comprising said register.

17. A device for selectively controlling the temperature of stored water in a tank over extended time periods, said tank having a heating element, a temperature sensing means and a water inlet and outlet, the improvement comprising:

(a) a control module, said control module including:
(i) CPU circuitry,
(ii) input circuitry, and
(iii) output circuitry,
said output circuitry comprising thermostat select circuitry, said input and said output circuitry connected to said CPU circuitry, (b) thermostat circuitry, said thermostat circuitry comprising a trio of independent thermostat circuits, a thermostat control panel, said panel connected to said thermostat circuitry, said thermostat panel including a trio of independent manually adjustable temperature controls comprising:
(i) a high temperature control,
(ii) a medium temperature control, and
(iii) a low temperature control;

said temperature controls each connected to one of said trio of thermostat circuits, said thermostat circuits responsive to said temperature sensing means, said thermostat circuitry connected to said control module, and (c) temperature sensor/control circuitry, said temperature sensor/control circuitry connected to said thermostat circuitry, said temperature sensor/control circuitry connected to said water tank whereby water in said tank will be maintained at the temperature manually selected in accordance with the particular thermostat circuit determined by said thermostat select circuitry.

* * * * *